United States Patent
Miklos

(10) Patent No.: US 8,371,427 B1
(45) Date of Patent: Feb. 12, 2013

(54) PORTABLE AND COLLAPSIBLE LOADING AND UNLOADING RAMP

(76) Inventor: Robert Nandor Miklos, Mesa, AZ (US)

(*) Notice: Subject to any disclaimer, the term of this patent is extended or adjusted under 35 U.S.C. 154(b) by 304 days.

(21) Appl. No.: 12/785,958

(22) Filed: May 24, 2010

(51) Int. Cl.
   *B65G 13/11* (2006.01)
(52) U.S. Cl. .................. 193/35 TE; 193/35 A; 414/537
(58) Field of Classification Search ............. 193/35 TE, 193/35 A; 198/581, 860.1; 414/571, 537, 414/538
   See application file for complete search history.

(56) References Cited

U.S. PATENT DOCUMENTS

| | | | | |
|---|---|---|---|---|
| 492,416 | A * | 2/1893 | Munchweiler | 280/32 |
| 2,390,785 | A * | 12/1945 | Eppler | 193/35 A |
| 2,421,670 | A * | 6/1947 | Webb | 193/35 A |
| 3,181,676 | A * | 5/1965 | Hire | 193/35 TE |
| 3,679,080 | A | 7/1972 | Fulcher | |
| 4,000,796 | A * | 1/1977 | Bolton et al. | 193/35 A |
| 4,779,298 | A * | 10/1988 | Nichols et al. | 14/69.5 |
| 5,542,810 | A * | 8/1996 | Florus | 414/538 |
| 5,810,546 | A | 9/1998 | Schmoling | |
| 6,210,096 | B1 | 4/2001 | Fielder | |
| 6,220,418 | B1 * | 4/2001 | Moradians | 193/35 A |
| 6,357,991 | B1 * | 3/2002 | Hamlett | 414/538 |
| 6,637,975 | B2 | 10/2003 | Foxwell | |
| 7,013,518 | B2 | 3/2006 | Leblanc | |
| 7,258,384 | B2 * | 8/2007 | Drabik et al. | 296/61 |
| 2004/0223836 | A1 * | 11/2004 | Robertson | 414/537 |
| 2006/0011675 | A1 * | 1/2006 | Scott | 223/120 |
| 2008/0019812 | A1 * | 1/2008 | Moryski | 414/462 |
| 2010/0040413 | A1 | 2/2010 | Whaley | |

OTHER PUBLICATIONS

VE-VE Iincorporated, Personal Watercraft Ramp, www.veveinc.com.

* cited by examiner

*Primary Examiner* — Gene Crawford
*Assistant Examiner* — Keith R Campbell
(74) *Attorney, Agent, or Firm* — Booth Udall, PLC

(57) ABSTRACT

A portable ramp for non-wheeled cargo such as, but not limited to, a personal watercraft, designed to assist the movement of cargo in and out of a truck or trailer bed. The invention is both light weight and collapsible for easy portability and stow ability. The invention consists of a composition of parts that facilitate quick assembly and disassembly. A plurality of square hollow tube rails, a plurality of center masts, a connection sleeve and a plurality self-braking wheels assist in the conveyance of cargo uphill with free spinning wheels and slow the cargo's movement downhill by engaging the wheels into a friction pad. The invention uses a wire cable that runs along the bottom of the said rails to strengthen the assembled ramp. This wire cable has adjustable tension and is engaged by extending the center mast downward creating a triangle shape.

19 Claims, 7 Drawing Sheets

VIEW KEY

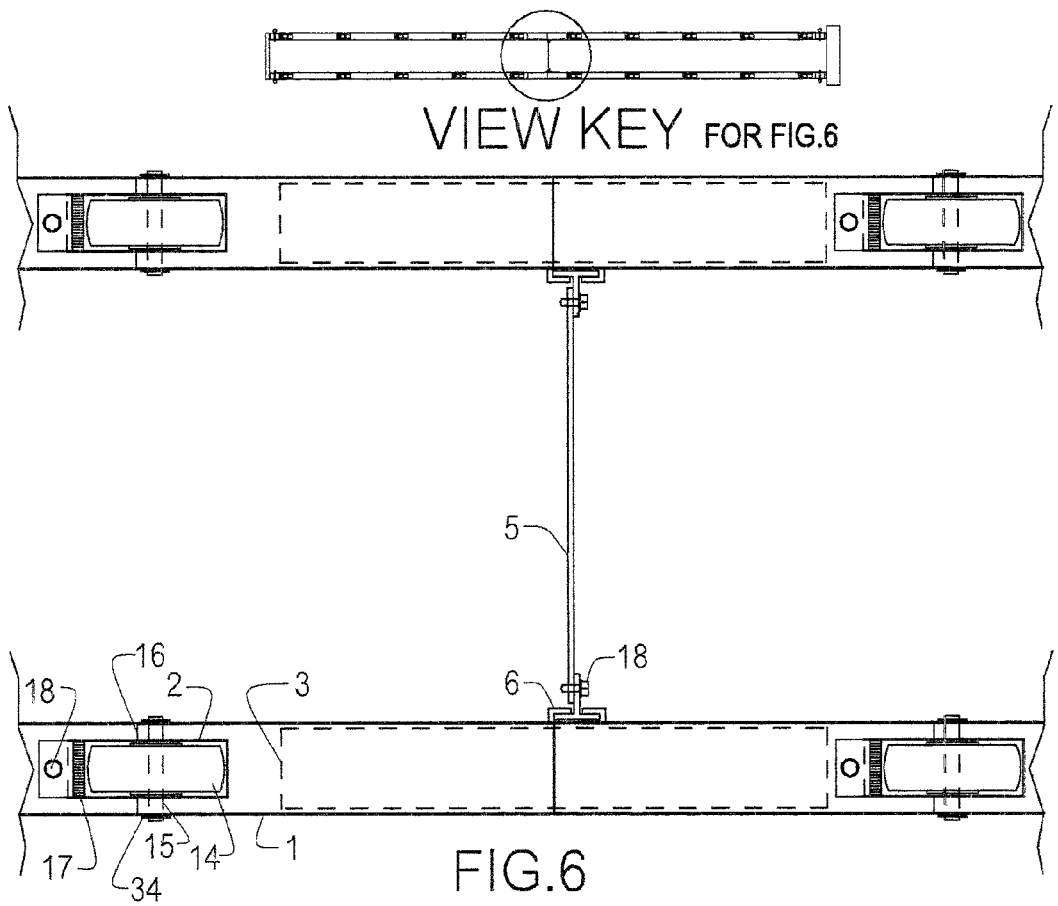
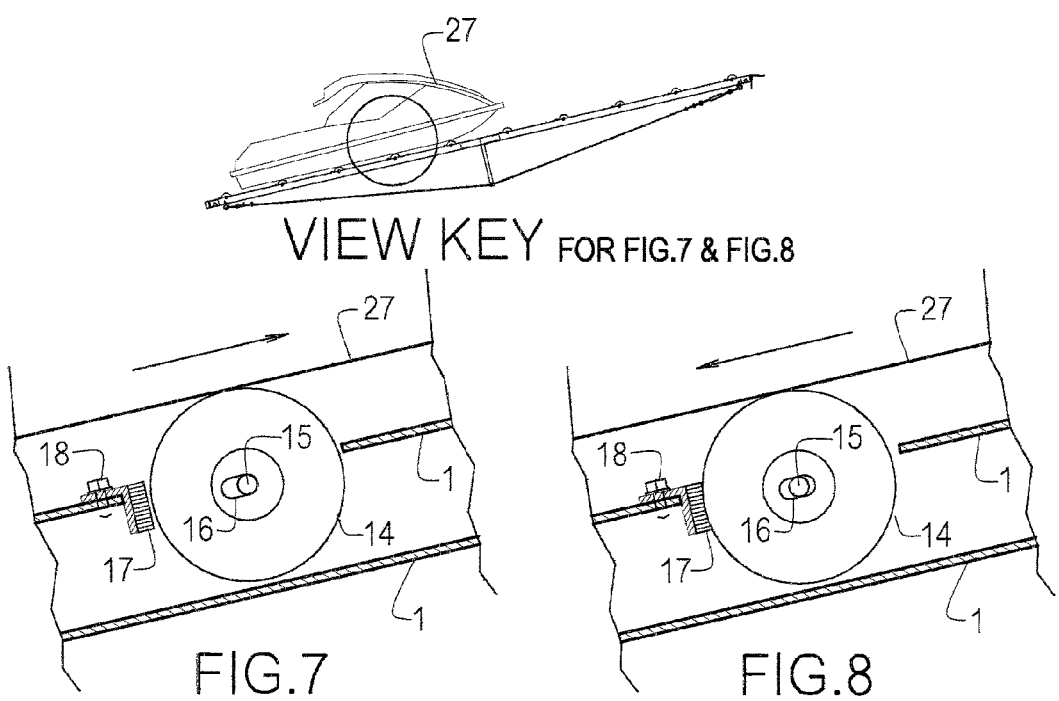

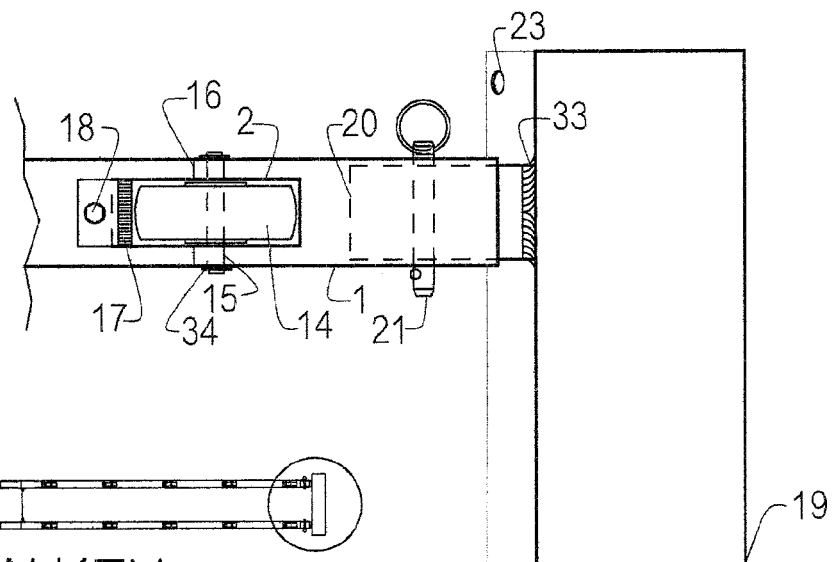
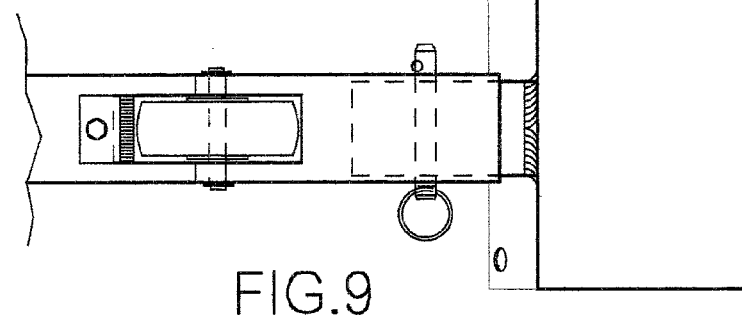
VIEW KEY FOR FIG.9
FIG.9
VIEW KEY FOR FIG.10
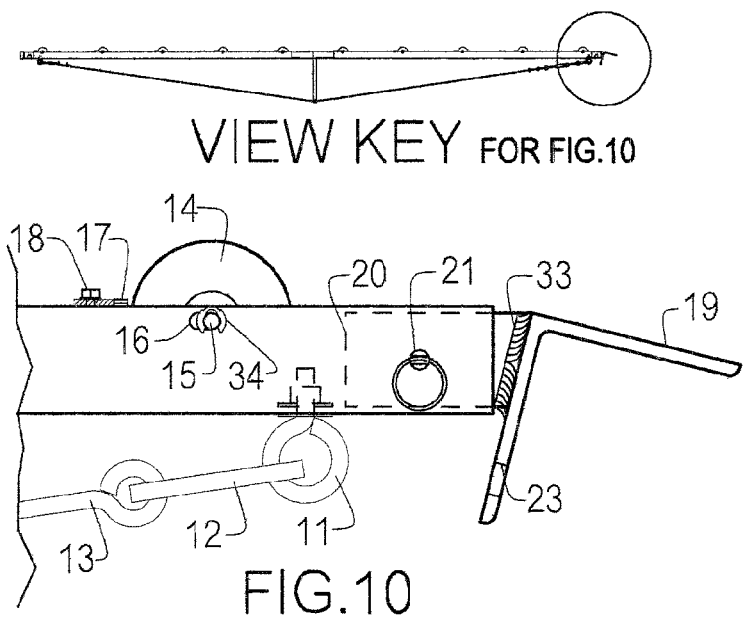
FIG.10

PORTABLE AND COLLAPSIBLE LOADING AND UNLOADING RAMP

STATEMENT REGARDING FEDERALLY SPONSERED RESEARCH OR DEVELOPMENT

No federally sponsored research and development was conducted.

BACKGROUND OF THE INVENTION

1. Field of the Invention

This invention generally relates to apparatus for loading and unloading non-wheeled cargo into the bed of a truck or trailer with an emphasis on light weight portability, compact stow ability without permanent attachment of any hardware to the truck or trailer. The apparatus is constructed from commonly available materials and components for economical manufacture.

2. Description of Prior Art

Loading ramps have been in use for many centuries and have evolved into many configurations utilizing many different materials to convey cargo from one area to another, usually involving a slope. This invention is intended for non-wheeled cargo such as, but not limited to a personal watercraft commonly known as a jet ski. There have been prior art inventions that are intended for personal watercraft storage and conveyance, particularly aiding in the movement in and out of a truck bed. However, these inventions tend to be large items that either require permanent attachment to a vehicle or require more than one person to move and operate the system.

The apparatus U.S. Pat. No. 5,810,546 to Schmoling is a large bulky design that limits the portability and stow ability because it can not be collapsed.

The apparatus illustrated in U.S. Pat. No. 6,210,096 to Fielder which is similar to the Schmoling apparatus requires permanent attachment to a truck which limits the product's portability in regards to it's use from one vehicle to another.

Another apparatus, U.S. Pat. No. 5,542,810 to Florus utilizes an assembly that is not permanently attached to the vehicle, however it can not load multiple watercraft into the same and/or different vehicles. It can only be used for a single watercraft in a single application. The bulky design of the apparatus would likely require more than one person to move and operate the system. Also, the apparatus can not be collapsed quickly and stowed in a small area.

The apparatus U.S. Pat. No. 6,637,975 to Foxwell has a similar roller system to the teachings of U.S. Pat. No. 5,810,546 to Schmoling but lacks the ability to load a watercraft safely into a truck bed and is intended to be a ground based shoreline docking system not a truck bed loading system.

The apparatus illustrated in U.S. Pat. No. 7,013,518 to Leblanc is collapsible and stow able but has many parts that need to be manufactured and many steps are required to collapse and stow the apparatus. This apparatus also lacks the ability to safely unload non-wheeled cargo.

None of the cited prior art are designed with an emphasis on portability and stow ability. Furthermore, the prior art does not address the adaptability of the apparatus to function on large, lifted trucks with modified suspensions. Truck beds on lifted trucks with modified suspensions are taller and create a need for a long loading ramp that decreases the slope angle. The prior art is impractical for use on a lifted truck because the slope angle of the ramp would be too steep, requiring more energy to move the cargo. The prior art does not mention any function of the prior art to slow the inertia of the cargo when unloading via the use of a self braking wheel.

BRIEF SUMMARY OF THE INVENTION

The primary object of this present invention is an apparatus designed to move non-wheeled cargo such as, but not limited to a personal watercraft from one leveled surface to another leveled surface with an emphasis on light weight portability and compact stow ability. This is achieved by using light weight materials that are tensioned into rigidity by a taut metal wire cable.

An important object of this apparatus is that it requires no permanent attachment and can be easily used and moved from one truck bed to another by a single person.

Another important object of this apparatus is the design of a self braking wheel system that slows the inertia of the cargo on a downward slope, thus creating a safer product that is easier to use by a single operator.

Another object of this apparatus is that it incorporates a longer design than most loading ramps. This additional length reduces the steepness of the slope angle which reduces the amount of energy required to move the cargo up hill and slows the cargo's inertia moving down hill. This additional length provides a use of this product on lifted trucks with modified suspensions. Traditional loading ramps are not practical for use on lifted trucks because the slope angle is too steep. This invention solves that problem.

Another object of this invention is that it eliminates the need for a trailer which is the most common conveyance vehicle used to transport a personal watercraft. Many lakes operate with a limited amount of boat trailer parking spaces and when full, patrons with trailers are usually turned away or sent to a waiting area. This invention solves that problem because it eliminates the need for a trailer, therefore allowing the patron access to the lake with their personal watercraft in a truck bed. The long length of this apparatus enables a personal watercraft to be launched into the water in areas that a trailer and or truck can not access or would get stuck in a muddy shoreline. The invention can also be used to launch a watercraft over small seawalls, boulders or other impediments that would restrict trailer access. Prior art of loading ramps that are commonly used with pick-up trucks, typically tend to be shorter in length then this said invention because of either heavy weight or too much flex associated with longer length ramps. The advantage of this invention is that it combines long length with light materials and is still able to maintain a rigid shape by a bottom mounted tension cable, similar to a cable suspended bridge that is turned up side down.

Another object of this invention is the design reduces weight. Long loading ramps are usually very heavy because of the relationship between span and size. The longer the distance of span the larger the size and weight of structural load bearing members need to be. This invention solves the problem of having to use large heavy structural members to span a greater distance. This invention uses a light weight tensioned wire cable to transfer the cargo's weight load from the middle of the ramp to each end which results in a stronger, lighter and more rigid design that can span a greater distance.

It is an additional object of this apparatus to be compact for easy stowage. The invention when retracted for stowage occupies only ten percent of the perimeter cubic space when used in its open operable state. This invention saves valuable cargo space.

Further objects and advantages of this invention will become apparent upon reading the following description of drawings and detailed description of the invention.

BRIEF DESCRIPTION OF SEVERAL VIEWS OF THE DRAWING

FIG. 6 is a partial top plan view, illustrating the connection of the center mast connection sleeve. A View Key is present to depict the location of the partial view which is circled.

FIG. 7 is a partial cross section cut away, illustrating the position of the clevis pin axle in the axle slot when cargo is moving up hill. A View Key is provided to depict the location of the partial view which is circled.

FIG. 8 is a partial cross section cut away, illustrating the position of the clevis pin axle in the axle slot and the wheel contacting the friction pad when the cargo is moving down hill. A View Key is provided to depict the location of the partial view which is circled.

FIG. 9 is a partial top plan view, illustrating the connection between the hollow tube rails and the mooring plate assembly. A View Key is provided to depict the location of the partial view which is circled.

FIG. 10 is a partial side elevation view, illustrating the connection between the hollow tube rails and the mooring plate assembly. A View Key is provided to depict the location of the partial view which is circled.

REFERENCE NUMERALS IN THE DRAWINGS

Figure 1:
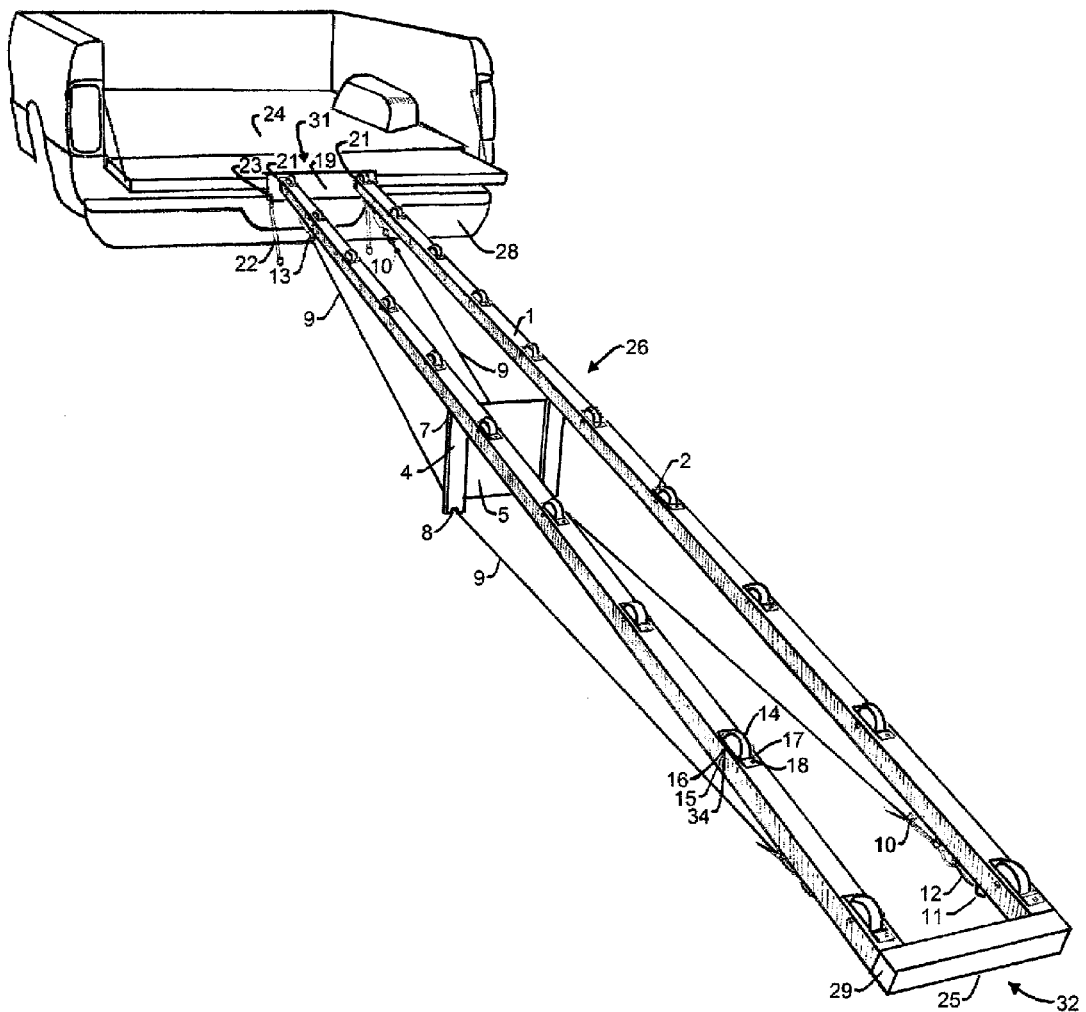
FIG. 1 is a perspective view of the apparatus in its fully assembled condition illustrating the intended placement for use between two different leveled surfaces for the purpose of unloading and loading non-wheeled cargo such as a personal watercraft.

1 Hollow tube rail
2 Wheel well
3 Hollow tube rail connection sleeve
4 Center mast
5 Center mast connection sleeve
6 Center mast connection sleeve receiver
7 Hinge pivot
8 Cable guide and roller
9 Wire cable
10 Wire cable connection hardware
11 Eye bolt
12 Carabiner
13 Turnbuckle
14 Wheel
15 Clevis pin axle
16 Axle slot
17 Fiction pad
18 Fastening screw
19 Mooring plate assembly
20 Receiver sleeve
21 Detent pin
22 Conventional tie down strap
23 Hole for tie down strap
24 Conventional pick up truck bed
25 Ground surface
26 The fully assembled apparatus
27 Cargo
28 Steel bumper
29 Resting block
30 Fabric stowage bag
31 Apparatus top end
32 Apparatus bottom end
33 Weld
34 Clevis pin retaining ring

DETAILED DESCRIPTION OF THE INVENTION

Figure 3:
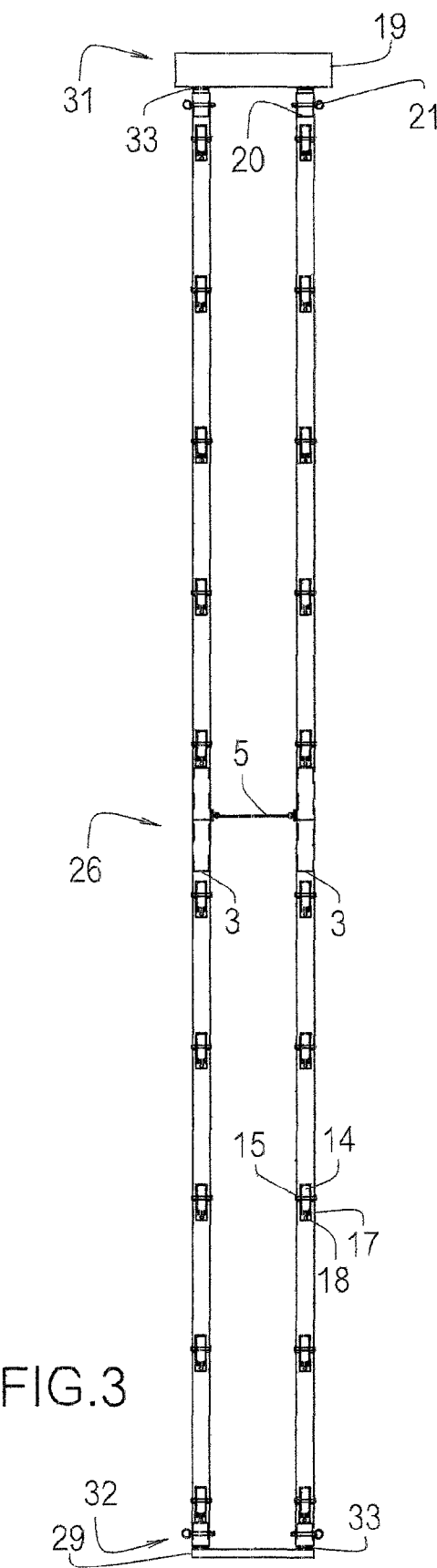
FIG. 3 is a top plan view of the apparatus in the fully assembled state.
Figure 4:
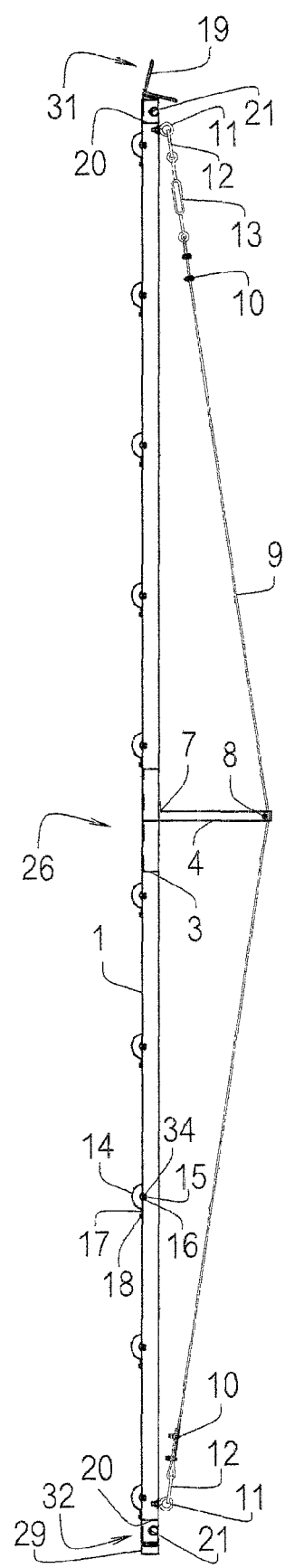
FIG. 4 is a side elevation view of the apparatus in the fully assembled state.
Figure 5:
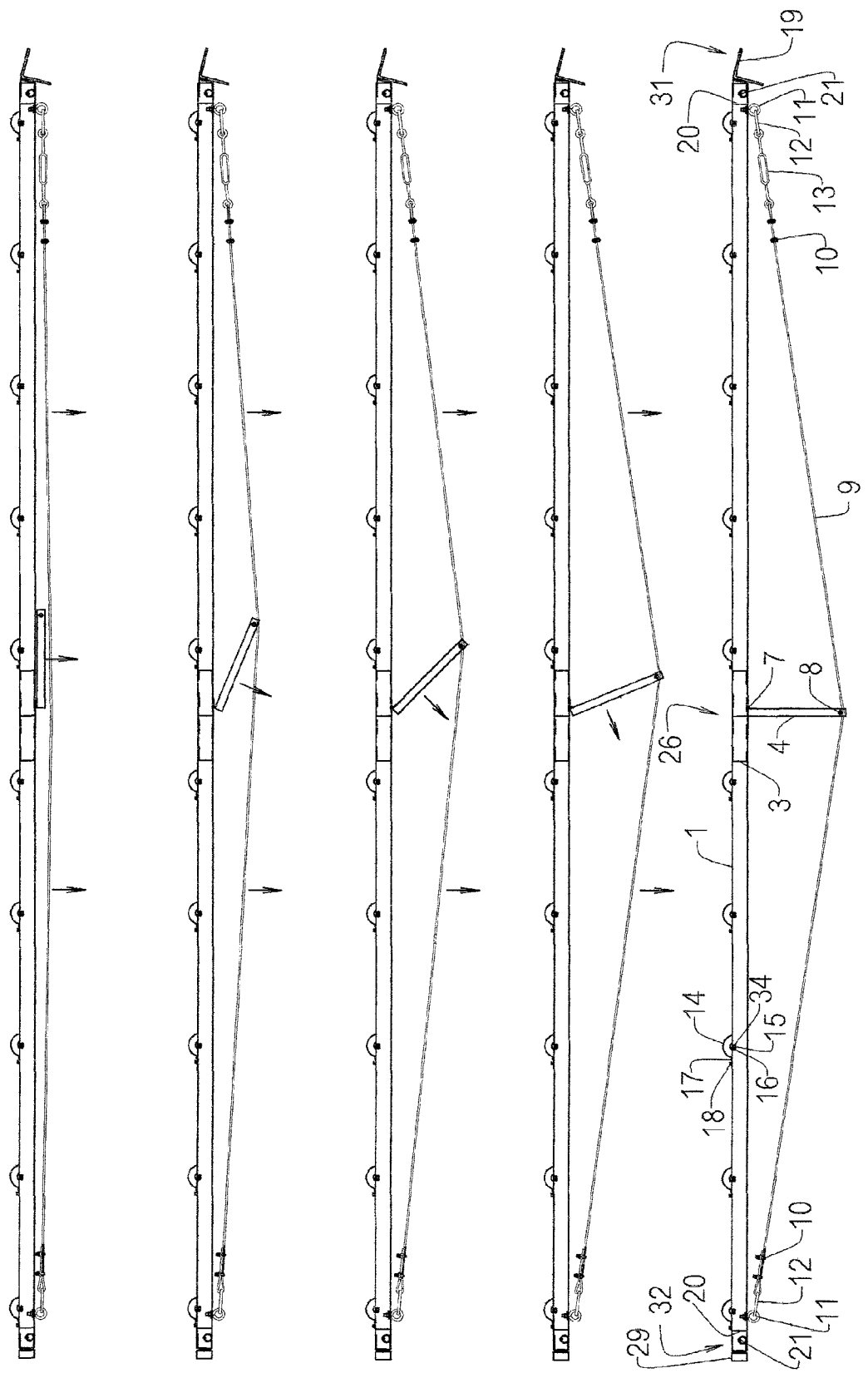
FIG. 5 is a multiple side elevation view, illustrating the motion of the center mast and bottom tension cable.
Figure 11:
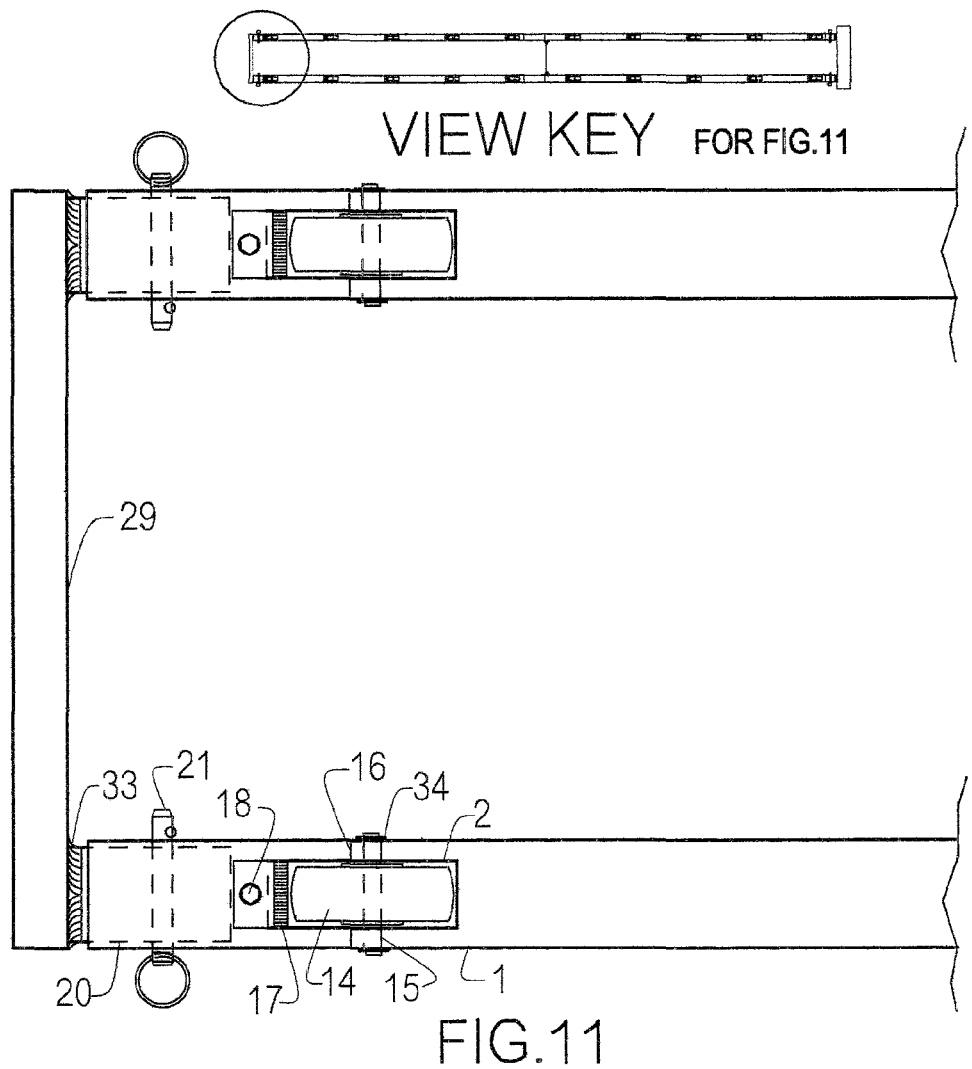
FIG. 11 is a partial top plan view, illustrating the connection between the hollow tube rails and the resting block. A View Key is provided to depict the location of the partial view which is circled.
Figure 12:
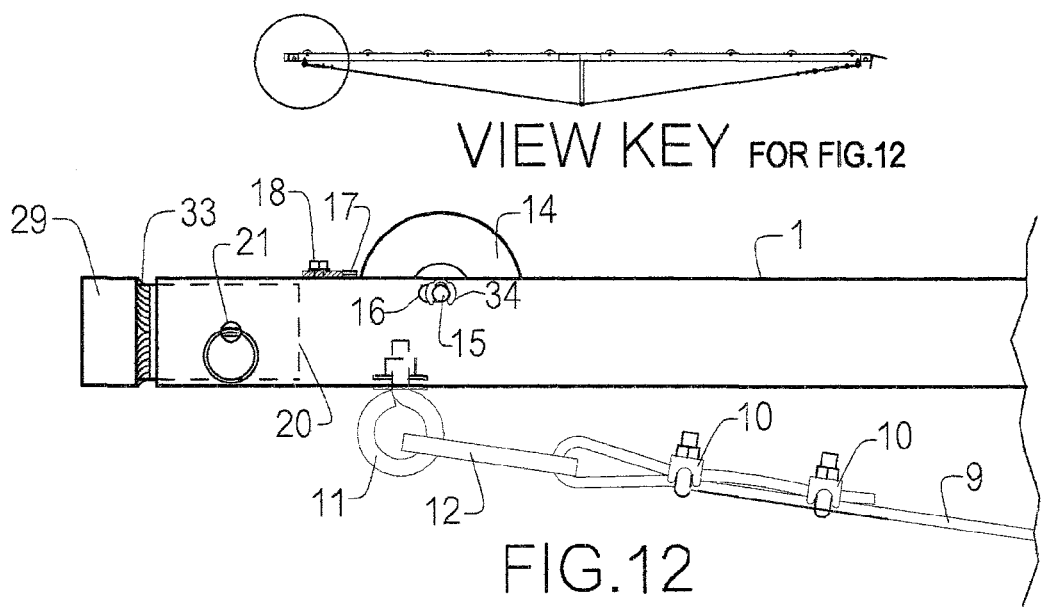
FIG. 12 is a partial side elevation view, illustrating the connection between the hollow tube rails and the resting block. A View Key is provided to depict the location of the view which is circled.

Although this invention may take specific forms that vary slightly from the illustrated drawings to accommodate different cargo 27 weights, the ideal practice of this invention will follow closely to the drawings illustrated. Referring now to the drawings and particularly FIGS. 1, 3, & 4 will represent the preferred embodiment and use of the fully assembled apparatus 26.

Using the fully assembled apparatus 26 requires the apparatus top end 31 known as the mooring plate assembly 19 to be moored on a conventional pick up truck bed 24 or similar and secured in place using a conventional tie down strap 22 connected to the mooring plate assembly 19 through a hole 23 and securing the other end of the conventional tie down strap 22 to a secure location deemed by the user such as a steel bumper 28. The apparatus bottom end 32 of the fully assembled apparatus 26 should rest on a ground surface 25 that is horizontally parallel with the mooring plate assembly 19 either out of water or below the water. When loading the cargo 27, the weight and inertia of the cargo 27, will cause the plurality of wheels 14 to spin freely and move forward and upward on the plurality of clevis pin axles 15 in the plurality of axle slots 16, releasing contact with the plurality of friction pads 17 illustrated in FIG. 7. When unloading the cargo 27, the weight and inertia of the cargo 27 will cause the plurality of clevis pin axles 15 to move downward and backward in the plurality of axle slots 16 which will engage the plurality of wheels 14 to contact the plurality of friction pads 17 and slow the decent of the cargo 27 down the ramp illustrated in FIG. 8. This invention is unlike prior art because the apparatus uses a gravity and inertia assisted braking and conveyance system, making this invention safer to operate than other prior art. Also the portability of this invention is unlike other prior art because this apparatus is designed to be quickly moved from one truck or trailer to another without permanent attachment being required.

Figure 2:
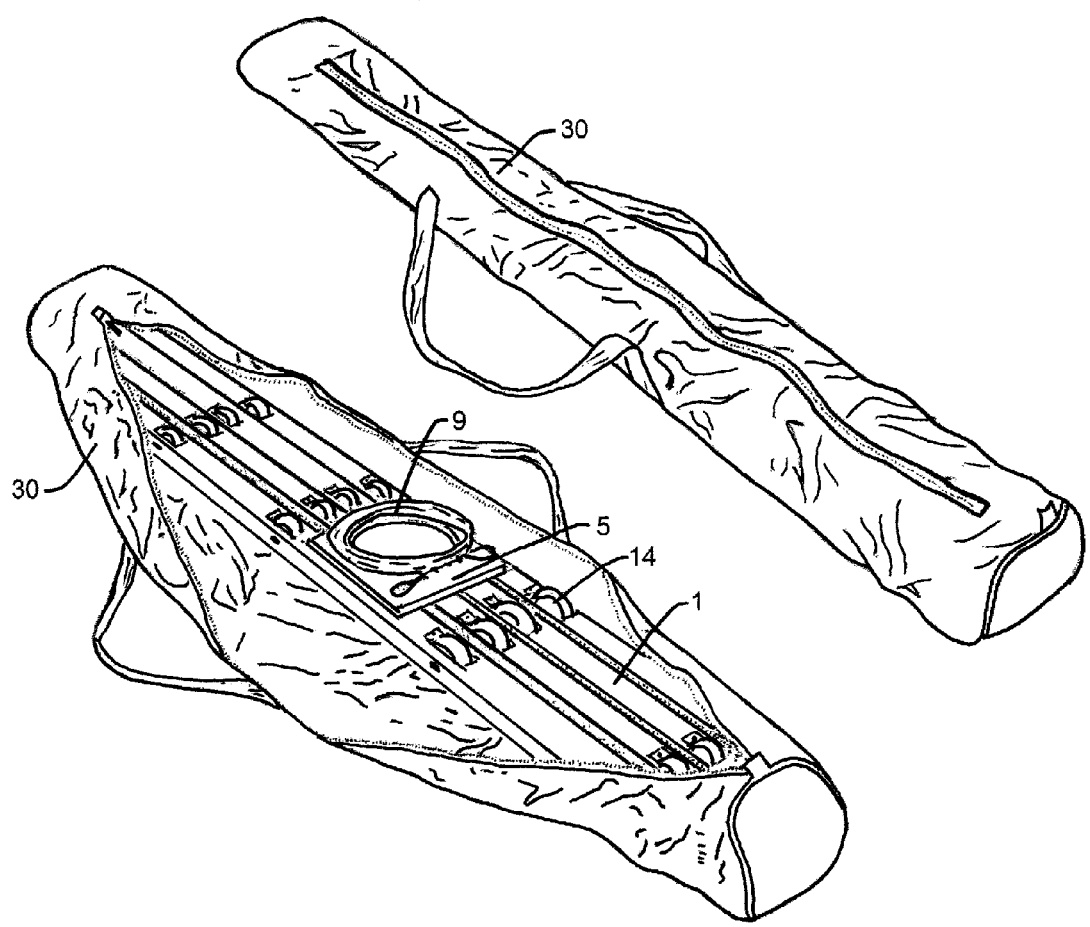
FIG. 2 is a perspective view of the apparatus in its fully compact stowed condition inside a fabric bag depicting the bag zipped open and closed.

When use of the fully assembled apparatus 26 is complete, the invention can be disassembled for compact stowage. FIGS. 2, 5, 6, 9, 10, 11, & 12 will represent the areas of the apparatus that are designed for disassemble. The stowed and disassembled apparatus in FIG. 2 is achieved by removing the conventional tie down strap 22 from the mooring plate assembly 19 and moving the fully assembled apparatus 26 to a level and safe area. First the plurality of center masts 4 are retracted via the purality of hinge pivots 7 into its retracted condition as illustrated oppositely in FIG. 5, which releases the tension in the wire cable 9. The released tension will free the wire cable 9 from the cable guide and roller 8. Next, illustrated in FIG. 6 the center mast connection sleeve 5 is removed from the center mast connection sleeve receiver 6. Next, illustrated in FIG. 11, the resting block 29 is removed from the hollow tube rails 1 by removing two detent pins 21 and sliding the receiver sleeve 20 out from the hollow tube rails 1. Next, illustrated in FIG. 9, the two detent pins 21 are removed from the connected hollow tube rail 1 and mooring plate assembly 19, and the receiver sleeve 20 is slid out. Next, the plurality of wire cables 9 are removed from the hollow tube rails 1 by disconnecting the plurality of carabiners 12 from the plurality of eyebolts 11. Lastly, the plurality of hollow tube rails 1 are separated from each other in the middle via the hollow tube rail connection sleeve 3. All the disassembled parts are now placed into the fabric stowage bag 30 for convenient transport illustrated in FIG. 2. This invention is unlike prior art because of it's compact stow ability. This invention is able to collapse its size into just ten percent of its fully assembled state. There is no known prior art that is able to be as compacted.

This invention was designed to utilize commonly available parts and manufactured materials with the least amount of manufacturing improvement steps for economical production and distribution. The process of manufacture of this apparatus 26 is described as the following. Aluminum square hollow tubes are cut to desired length with a metal cutting saw to form the plurality of hollow tube rails 1. These hollow tube rails 1 are then machine milled and drilled to form the plurality of wheel wells 2, the plurality of axle slots 16, and plurality of eyebolt 11 holes using a conventional milling machine and drill press. The plurality of center masts 4 are cut to length, drilled and a slot is milled to form the cable guide and roller 8. A small round tube sleeve is installed with a bolt to complete the cable guide and roller 8. The hollow tube rail connection sleeve 3 is telescopically inserted into the hollow tube rails 1. A plurality of self tapping fastening screws 18 and a plurality of hinge pivots 7 are then used to affix the plurality of center masts 4 and the plurality of hollow tube rail connection sleeves 3 with the plurality of hollow tube rails 1. Next the plurality of eyebolts 11 are attached to the plurality of hollow tube rails 1. Next, wire cable 9 is cut to length and connected to the plurality of turnbuckles 13 and the plurality of carabiners 12 using a plurality of wire cable connection hardware 10. The plurality of wire cables 9 and assembled parts are complete and ready for packaging. The plurality of wheels 14 and plurality of clevis pin axles 15 are then installed into the plurality of hollow tube rails 1 via the plurality of wheel wells 2 and the plurality of axle slots 16. A plurality of clevis pin retaining rings 34 are attached to the plurality of clevis pin axles 15 to secure them in place. A plurality of friction pads 17 is attached with adhesive and a plurality of fastening screws 18 to upper surface of the plurality of hollow tube rails 1 next to the plurality of wheel wells 2. Next, illustrated in FIGS. 9, & 10 the mooring plate assembly 19 is cut to length using a metal cutting saw. A plurality of receiver sleeves 20 are also cut to length and then welded 33 to the mooring plate assemble 19. The mooring plate assembly 19 is then drilled with the plurality of hollow tube rails 1 to receive the plurality of detent pins 21. The mooring plate assembly 19 is also drilled to form the holes 23 for the conventional tie down straps 22. Illustrated in FIGS. 11, & 12 the resting block 29 is cut to size using a metal cutting saw and welded 33 together with a plurality of connection sleeves 20. Finally, all individually parts are sanded and vinyl marketing graphics are applied to the apparatus which is complete and ready to ship to consumers. Other prior art seem to use many more parts and materials to achieve the goal of loading and unloading cargo similar but not limited to a personal watercraft into a pick-up truck bed. This invention reduces the amount of individual parts and steps of manufacture, therefore, creating a more economically viable product.

Having thus described the invention, what is claimed as new and desired to be secured by Letters of Patent is as follows:

1. A portable loading and unloading ramp comprising:
    a plurality of rails each comprising a plurality of wheel wells in a top surface of the rails, the plurality of rails coupled parallel to each other with at least one of a center mast connection sleeve, a mooring plate assembly, and a resting block;
    a plurality of wire cable assemblies, wherein each one of the plurality of wire cable assemblies is coupled to an underside of a different one of the plurality of rails on a first end of the rail and on a second end of the rail opposite the first end;
    a plurality of center masts, wherein each one of the plurality of center masts is hingedly coupled to the underside of a different one of the plurality of rails such that when the center mast is extended outward substantially perpendicular to the underside of the rail, the center mast exerts tension on wire cable assembly coupled to the respective rail of the plurality of rails;
    a plurality of movable axles, each one of the plurality of axles movably coupled to one of the plurality of rails across a different one of the plurality of wheel wells, wherein each one of the plurality of axles moves bilaterally responsive to movement of cargo on the ramp;
    a plurality of wheels, each one of the plurality of wheels rotatably mounted to a different one of the plurality of axles and at least partially within a different one of the plurality of wheel wells, each of the plurality of wheels rotatable independent of each other of the plurality of wheels; and
    a plurality of friction pads each removably coupled to the top surface of at least one of the plurality of rails, each of the plurality of friction pads substantially perpendicular to the top surface of the at least one of the plurality of rails and at least partially within the at least one of the plurality of rails at a different one of the plurality of wheel wells.

2. The portable loading and unloading ramp of claim 1, wherein each of the plurality rails comprises a first hollow rail and a second hollow rail telescopically coupled together with an internal sleeve.

3. The portable loading and unloading ramp of claim 2, wherein the center mast connection sleeve is coupled between the center masts.

4. The portable loading and unloading ramp of claim 3, further comprising a plurality of center mast connection sleeve receivers, wherein a portion of the center mast connection sleeve is inserted into the plurality of center mast connection sleeve receivers and braces the assembly from forces of torsion.

5. The portable loading and unloading ramp of claim 1, wherein the plurality of center masts each comprise a cable guide and a roller that allows movement of the center mast along the respective wire cable assembly when the center mast is extended outward from the underside of the respective rail.

6. The portable loading and unloading ramp of claim 1, wherein each of the plurality of wire cable assemblies comprise at least one of adjustable tension wire connection hardware, turnbuckles, and removable connection fasteners.

7. The portable loading and unloading ramp of claim 6, wherein tension on each of the plurality of wire cable is adjustable.

8. A portable ramp, comprising:
- at least two rails coupled parallel to each other, each of the at least two rails comprising a first end, a second end opposite the first end, and a plurality of wheel well openings in a top surface of the rails;
- a plurality of axles each movably coupled to opposing sides of one of the rails within a different one of the plurality of wheel well openings, each of the plurality of axles movable between a first position closer to the first end of the rail and a second position closer to the second end of the rail;
- a plurality of friction pads each removably coupled substantially perpendicular to the top surface of the respective rail and adjacent to a different one of the plurality of wheel well openings between the axle corresponding to the one of the plurality of wheel well openings and the second end of the respective rail; and
- a plurality of a wheels each rotatably coupled to a different one of the plurality of axles and partially housed within the respective rail, each of the plurality of wheels responsive to move the axle to the first position when cargo on the respective wheel moves towards the first end of the respective rail and responsive to move the axle to the second position and engage with the respective friction pad when cargo on the respective wheel moves toward the second end of the respective rail.

9. The portable ramp of claim 8, wherein each one of the at least two rails comprises two hollow rails removably coupled together and the portable ramp further comprises:
- at least two center masts, each of the at least two center masts hingedly coupled to a different one of the at least two rails on a side of the respective rail opposite the wheel well opening such that each of the at least two center masts pivots between a first mast position parallel to the at least two rails and a second mast position perpendicular to the at least two rails; and
- at least two wire cables, each of the at least two wire cables coupled the first end and the second end of a different one of the at least two rails, wherein when the center mast is in the second position the respective wire cable is taught against an end of the center mast opposite the rail.

10. The portable ramp of claim 9, wherein the two hollow rails of each of the rails are removably coupled together with an internal sleeve.

11. The portable ramp of claim 10, further comprising:
- a center mast connection sleeve removably coupled to the at least two center masts between the at least two center masts;
- a mooring plate assembly removably coupled to the second ends of the at least two rails; and
- a resting block removably coupled to the first ends of the at least two rails.

12. The portable ramp of claim 11, wherein each of the center masts comprises a center mast connection sleeve receiver that allows the center mast connection sleeve to slidably engage with the center masts.

13. The portable ramp of claim 12, wherein each of the center masts comprises a roller on the end of the center mast opposite the rail configured to roll along the respective wire cable when the center mast is extended to the second position.

14. The portable ramp of claim 13, further comprising two axle slots on opposing sides of each wheel well opening, wherein the two axle slots are substantially parallel to the top plane of the respective rail and are sized to house at least a portion of one of the plurality of movable axles.

15. The portable ramp of claim 14, wherein the mooring plate comprises two perpendicular walls and two sleeves extending from one of the two perpendicular walls, and wherein each of the two sleeves of the mooring plate is sized to fit within a different one of the two rails and located on the one of the two perpendicular walls to align with the one of the two rails.

16. The portable ramp of claim 15, further comprising at least one detent pin inserted through at least one of the two rails and the two sleeves of the mooring plate.

17. A portable ramp, comprising:
- at least two rails coupled parallel to each other, each of the at least two rails comprising a first end, a second end opposite the first end, and a plurality of wheel well openings on a top surface of the rails;
- a plurality of movable axles each adjacent to a different one of the plurality of wheel well openings and movably coupled to opposing sides of the respect rails between a first position closer to the first end of the rail and a second position closer to the second end of the rail;
- a plurality of friction pads each removably coupled to the top surface of a different one of the plurality of wheel well openings and positioned between the axle and the second end of the respective rail; and
- a plurality of wheels each rotatably coupled to a different one of the plurality of axles and partially housed within the respective rail, each of the plurality of wheels responsive to move with the respective axle between the first position and the second position and engage with the respective friction pad when the axle is in the second position.

18. The portable ramp of claim 17, further comprising:
- a mooring plate assembly coupled to the first ends of the two rails; and
- a resting block coupled to the second ends of the two rails.

19. The portable ramp of claim 18, wherein each of the plurality of friction pads are positioned perpendicular to a top plane of the respective rail and each end of each of the axles is movably coupled within a slot parallel to the top plane of the respective rail.

* * * * *